(12) United States Patent
Lin et al.

(10) Patent No.: US 8,410,012 B2
(45) Date of Patent: Apr. 2, 2013

(54) CATALYST COMPOSITION, METHOD FOR FABRICATING THE SAME AND FUEL CELL INCLUDING THE SAME

(75) Inventors: Hong-Ming Lin, Taipei (TW); Cheng-Han Chen, Taipei (TW); Wei-Jen Liou, Taipei (TW); Wei-Syuan Lin, Taipei (TW); She-Huang Wu, Taipei (TW)

(73) Assignees: Tatung University (TW); Tatung Company (TW)

( * ) Notice: Subject to any disclaimer, the term of this patent is extended or adjusted under 35 U.S.C. 154(b) by 575 days.

(21) Appl. No.: 12/654,918

(22) Filed: Jan. 8, 2010

(65) Prior Publication Data
US 2011/0097650 A1 Apr. 28, 2011

(30) Foreign Application Priority Data
Oct. 28, 2009 (TW) .............................. 98136428 A

(51) Int. Cl.
| | |
|---|---|
| H01M 4/88 | (2006.01) |
| H01M 4/02 | (2006.01) |
| H01M 4/36 | (2006.01) |
| H01M 4/92 | (2006.01) |
| H01M 4/94 | (2006.01) |
| H01M 4/90 | (2006.01) |
| H01M 4/13 | (2010.01) |
| H01M 4/34 | (2006.01) |
| H01M 4/54 | (2006.01) |
| H01M 10/32 | (2006.01) |
| H01M 4/00 | (2006.01) |
| H01M 4/50 | (2010.01) |
| B01J 21/18 | (2006.01) |
| B01J 23/00 | (2006.01) |
| B01J 23/40 | (2006.01) |
| B01J 23/74 | (2006.01) |

(52) U.S. Cl. ........ 502/185; 502/101; 502/184; 429/523; 429/524; 429/525; 429/526; 429/527; 429/219; 429/221; 429/223; 429/224

(58) Field of Classification Search .................. 502/101, 502/184, 185; 429/523–527, 219, 221, 223, 429/224
See application file for complete search history.

(56) References Cited

U.S. PATENT DOCUMENTS 7,132,188 B2 * 11/2006 Masel et al. .................. 429/494
7,381,682 B1 * 6/2008 Jia et al. ........................ 502/327
(Continued)

FOREIGN PATENT DOCUMENTS
TW            I328470 B       8/2010

OTHER PUBLICATIONS

"Synthesis of highly dispersed Pd/C electro-catalyst with high activity for formic acid oxidation," Huanqiao Li et al. Electrochemistry Communications 9 (2007), pp. 1410-1415.*

(Continued)

*Primary Examiner* — Patricia L Hailey
(74) *Attorney, Agent, or Firm* — Bacon & Thomas, PLLC

(57) ABSTRACT

The present invention relates to a catalyst composition, a method for fabricating the same and a fuel cell including the same. The catalyst composition provided by the present invention includes: a catalyst carrier; and a metal solid solution, disposed on the surface of the catalyst carrier, in which the metal solid solution includes palladium and a second metal, and the second metal is selected from the group consisting of gold, platinum, ruthenium, nickel, silver and manganese. Accordingly, the catalyst composition provided by the present invention can exhibit excellent catalytic characteristics, and can be applied in a fuel cell to enhance the electrochemical properties and stability of the fuel cell.

13 Claims, 4 Drawing Sheets

U.S. PATENT DOCUMENTS

| | | | | |
|---|---|---|---|---|
| 7,589,043 B2 * | 9/2009 | Yoo et al. | | 502/180 |
| 7,867,942 B2 * | 1/2011 | Lo et al. | | 502/185 |
| 7,875,569 B2 * | 1/2011 | Roev et al. | | 502/180 |
| 2006/0094597 A1 * | 5/2006 | Goia et al. | | 502/326 |
| 2008/0020924 A1 * | 1/2008 | Jeng et al. | | 502/185 |
| 2008/0241642 A1 * | 10/2008 | Iordache et al. | | 429/44 |
| 2009/0029216 A1 * | 1/2009 | Yamamoto | | 429/30 |
| 2010/0285392 A1 * | 11/2010 | Elabd et al. | | 429/484 |

OTHER PUBLICATIONS

"Nanostructured Pt/C and Pd/C catalysts for direct formic acid fuel cells," Zhaolin Liu et al. Journal of Power Sources 161 (2006), pp. 831-835.*

"Preparation and characterization of nano-sized Pt-Pd/C catalysts and comparison of their electro-activity toward methanol and ethanol oxidation," F. Kadirgan et al. International Journal of Hydrogen Energy 34 (2009), pp. 4312-4320.*

"Preparation and formation mechanisms of uniform metallic particles in homogeneous solutions," Dan V. Goia. J. Mater. Chem., 2004, 14, pp. 451-458.*

"Preparation of monodispersed metal particles," Dan V. Goia et al. New J. Chem., 1998, pp. 1203-1215.*

* cited by examiner

CATALYST COMPOSITION, METHOD FOR FABRICATING THE SAME AND FUEL CELL INCLUDING THE SAME

BACKGROUND OF THE INVENTION

1. Field of the Invention

The present invention relates to a catalyst composition, a method for fabricating the same and a fuel cell including the same and, more particularly, to a catalyst composition suitable for enhancing electrochemical characteristics and stability of a fuel cell, a method for fabricating the same and a fuel cell including the same.

2. Description of Related Art

Currently, fuel cell systems have been widely used in various applications as electrical power supplies. For example, fuel cell systems can be applied in vehicles as power supplies in replacement of internal combustion engines, or as portable electrical power supplies for video cameras, computers, PDAs or portable telephones.

Direct liquid fuel cells are the most suitable power sources for various portable electric products or light electric vehicles. Taking direct methanol fuel cells as example, although their power is lower in comparison to proton exchange membrane fuel cells, they exhibit long-term operation, long standby time and high current density, owing to continuous advancement in research in the field. In addition, a direct methanol fuel cell is lighter, thinner, shorter and smaller than a proton exchange membrane fuel cell, and its fuel (i.e. methanol) is lighter. Thereby, direct methanol fuel cells are more popular. However, direct methanol fuel cells have some drawbacks, such as methanol crossover through the proton exchange membrane to the cathode and instability of cell systems due to platinum being poisoned. Accordingly, many researchers have devoted themselves to creating other liquid fuel cells. Since palladium (as a catalyst for formic acid) has no carbon monoxide (CO) poisoning problem, direct formic acid fuel cells have become widely developed. Besides, because of low possibility of formic acid crossover, formic acid can be used in higher concentration to enhance current density. Moreover, the cost of palladium is low and it thereby has economical benefit. However, the problem of OH radical adsorption on the palladium catalyst leading to lower current density should be resolved, and the catalytic characteristics of palladium catalyst need more improvement.

SUMMARY OF THE INVENTION

The object of the present invention is to provide a method for fabricating a catalyst composition with improved catalytic characteristics and higher stability and to improve the conventional problem of OH radical adsorption on palladium causing the decrease of current density.

To achieve the object, the present invention provides a method for fabricating a catalyst composition, including: (A) mixing a catalyst carrier and a reducing agent to form a solution; (B) adding a palladium precursor and a second metal precursor into the solution to perform a reduction reaction and thus to deposit palladium and a second metal on the surface of the catalyst carrier, where the second metal is selected from the group consisting of gold, platinum, ruthenium, nickel, silver and manganese; and (C) performing a first heat treatment on the catalyst carrier with the palladium and the second metal deposited thereon, and performing a second heat treatment in the presence of a reducing gas to form a metal solid solution on the surface of the catalyst carrier, where the metal solid solution includes the palladium and the second metal.

Accordingly, a catalyst composition may be obtained by the above-mentioned method, which includes: a catalyst carrier; and a metal solid solution, disposed on the surface of the catalyst carrier, where the metal solid solution includes palladium and a second metal, and the second metal is selected from the group consisting of gold, platinum, ruthenium, nickel, silver and manganese. Herein, the catalyst carrier may be a carbon nanotube or a carbon black.

In the method according to the present invention, the metal catalyst is formed on the surface of the catalyst carrier by chemical reduction, and the metal solid solution is formed by the first heat treatment and the second heat treatment so as to optimize catalytic characteristics. Herein, the conventional problem of OH radical adsorption on palladium causing the decrease of current density can be resolved by performing the second heat treatment in the presence of a reducing gas.

In the method according to the present invention, the reducing agent may be a polyol solvent, such as ethylene glycol, propylene glycol or butylene glycol.

In the method according to the present invention, the palladium precursor may be any material that can be transformed into palladium by reaction, such as palladium salts, palladium hydrates or palladium chloride. Similarly, the second metal precursor may be any material that can be transformed into the second metal by reaction, such as metal salts, metal hydrates or metal chlorides.

In the step (B) of the method according to the present invention, preferably, the palladium precursor and the second metal precursor are added into the solution in sequence.

In the step (B) of the method according to the present invention, the reduction reaction of the palladium precursor and the second metal precursor is performed at a temperature preferably in a range of 150° C. to 300° C., and more preferably in a range of 150° C. to 200° C.

In the step (B) of the method according to the present invention, the pH value of the solution is adjusted preferably in a range of 6 to 12, and more preferably in a range of 6 to 8, such that the degree of dispersion of metal nanoparticles can be enhanced and thereby aggregation can be avoided so as to uniformly deposit the metal nanoparticles on the surface of the catalyst carrier.

In the method according to the present invention, preferably, the first heat treatment is performed at a temperature in a range of 200° C. to 300° C.

In the method according to the present invention, preferably, the second heat treatment is performed at a temperature in a range of 180° C. to 250° C.

In the method according to the present invention, the reducing gas may be any gas capable of providing reduction reaction, such as a mixture of hydrogen gas and argon gas. Preferably, the ratio of the hydrogen gas to the reducing gas is in a range of 1% to 10% by mole, and more preferably is in a range of 1% to 8% by mole.

The catalyst composition provided by the present invention may be applied in an anode of a fuel cell. Accordingly, the present invention further provides a fuel cell, including: an anode, including a catalyst composition; a cathode; and an electrolyte membrane, disposed between the anode and the cathode, where the catalyst composition includes: a catalyst carrier; and a metal solid solution, disposed on the surface of the catalyst carrier, in where the metal solid solution includes palladium and a second metal, and the second metal is selected from the group consisting of gold, platinum, ruthenium, nickel, silver and manganese. Herein, the fuel cell may be a formic acid fuel cell.

As mentioned above, the present invention utilizes the first heat treatment and the second heat treatment to transform palladium and the second metal into a metal solid solution and thereby to optimize the catalytic characteristics. Accordingly, in comparison to conventional palladium catalyst (single-metal catalyst), better electrochemical characteristics and higher stability can be achieved in the case of applying the catalyst composition provided by the present invention in a fuel cell. Meanwhile, the conventional problem that OH radical adsorption on palladium causes the decrease of current density can be resolved by performing the second heat treatment in the presence of a reducing gas.

Other objects, advantages, and novel features of the invention will become more apparent from the following detailed description when taken in conjunction with the accompanying drawings.

DETAILED DESCRIPTION OF THE PREFERRED EMBODIMENT

Example 1

First, multi-wall carbon nanotubes (MWCNTs) are dispersed in ethylene glycol (as a reducing agent) to form a solution. Next, after the solution is heated up to 170° C., palladium chloride (as a palladium precursor) is added therein, followed by stirring for 20 minutes. Then, aurochtorohydric acid ($HAuCl_4 \cdot 4H_2O$, $HAuCl_4 \cdot 3H_2O$, as a gold precursor) is added therein and the pH value is adjusted to about 8 by using potassium hydroxide, followed by stirring for 20 minutes, and then powder (i.e. multi-wall carbon nanotubes with palladium and gold deposited thereon) is collected.

Subsequently, in the presence of argon protection gas, the multi-wall carbon nanotubes with palladium and gold deposited thereon are subjected to a first heat treatment (i.e. calcination) at 250° C. for 90 minutes. Then, a second heat treatment is performed in the presence of $H_2/Ar$ mixture (as a reducing gas) at 200° C. for 60 minutes, such that a metal solid solution is formed from palladium and gold on the surface of the multi-wall carbon nanotubes. Accordingly, the catalyst composition (i.e. Pd—Au/MWCNTs) of the present example can be obtained, which includes: catalyst carriers (i.e. MWCNTs); and metal solid solution consisting of palladium and gold and disposed on the surface of the catalyst carriers.

Example 2

Figure 1:
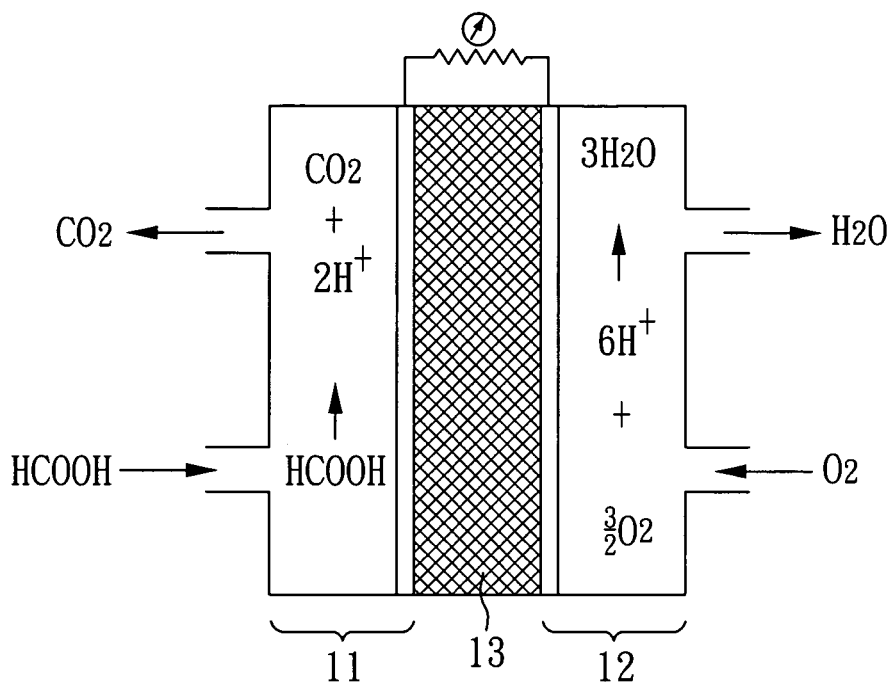
FIG. 1 shows a schematic diagram of a formic acid fuel cell according to a preferred example of the present invention.

The present example provides a formic acid fuel acid. As shown in FIG. 1, the formic acid fuel cell of the present example includes: an anode 11, including the catalyst composition (not shown in the figure) provided by Example 1; a cathode 12; and an electrolyte membrane 13, disposed between the anode 11 and the cathode 12.

Comparative Example 1

First, multi-wall carbon nanotubes (MWCNTs) are dispersed in ethylene glycol (as a reducing agent) to form a solution. Next, after the solution is heated up to 170° C., palladium chloride (as a palladium precursor) is added therein, followed by adding potassium hydroxide to adjust pH value to about 8. Next, the solution is stirred for 20 minutes, and then powder (i.e. multi-wall carbon nanotubes with palladium deposited thereon) is collected. Finally, the collected powder is subjected to a first heat treatment and a second heat treatment in the manner as Example 1 so as to obtain a comparative sample A (i.e. Pd/MWCNTs).

Comparative Example 2

First, multi-wall carbon nanotubes (MWCNTs) are dispersed in ethylene glycol (as a reducing agent) to form a solution. Next, after the solution is heated up to 170° C., aurochtorohydric acid (as a gold precursor) is added therein, followed by adding potassium hydroxide to adjust pH value to about 8. Next, the solution is stirred for 20 minutes, and then powder (i.e. multi-wall carbon nanotubes with gold deposited thereon) is collected. Finally, the collected powder is subjected to a first heat treatment and a second heat treatment in the manner as Example 1 so as to obtain a comparative sample B (i.e. Au/MWCNTs).

Test Example

《X-ray Diffraction (XRD) Analysis》

The XRD analysis is performed on Pd—Au/MWCNTs, Pd/MWCNTs (i.e. the comparative sample A) and Au/MWCNTs (i.e. the comparative sample B) prepared by Example 1, Comparative Example 1 and Comparative Example 2, respectively. The result is shown in FIG. 2.

Figure 2:
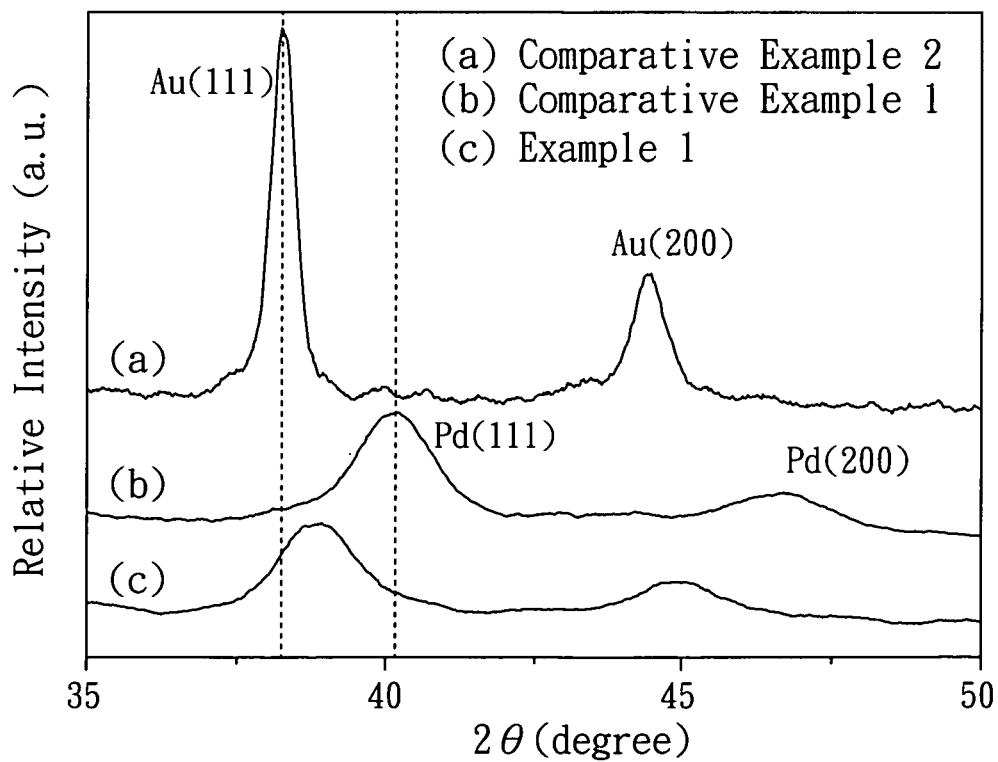
FIG. 2 shows X-ray diffraction spectrum data of Pd—Au/MWCNTs provided by Example 1, MWCNTs provided by Comparative Example 1 and Au/MWCNTs provided by Comparative Example 2.

From FIG. 2, it can be found that two main diffraction peaks of Pd—Au/MWCNTs provided by Example 1 respectively lay between Au (111) and Pd (111) and between Au (200) and Pd (200). Thereby, it can be confirmed from FIG. 2 that multi-wall carbon nanotubes with Pd—Au solid solution formed thereon are obtained by Example 1.

《Cyclic Voltammetry Test》

Figure 3:
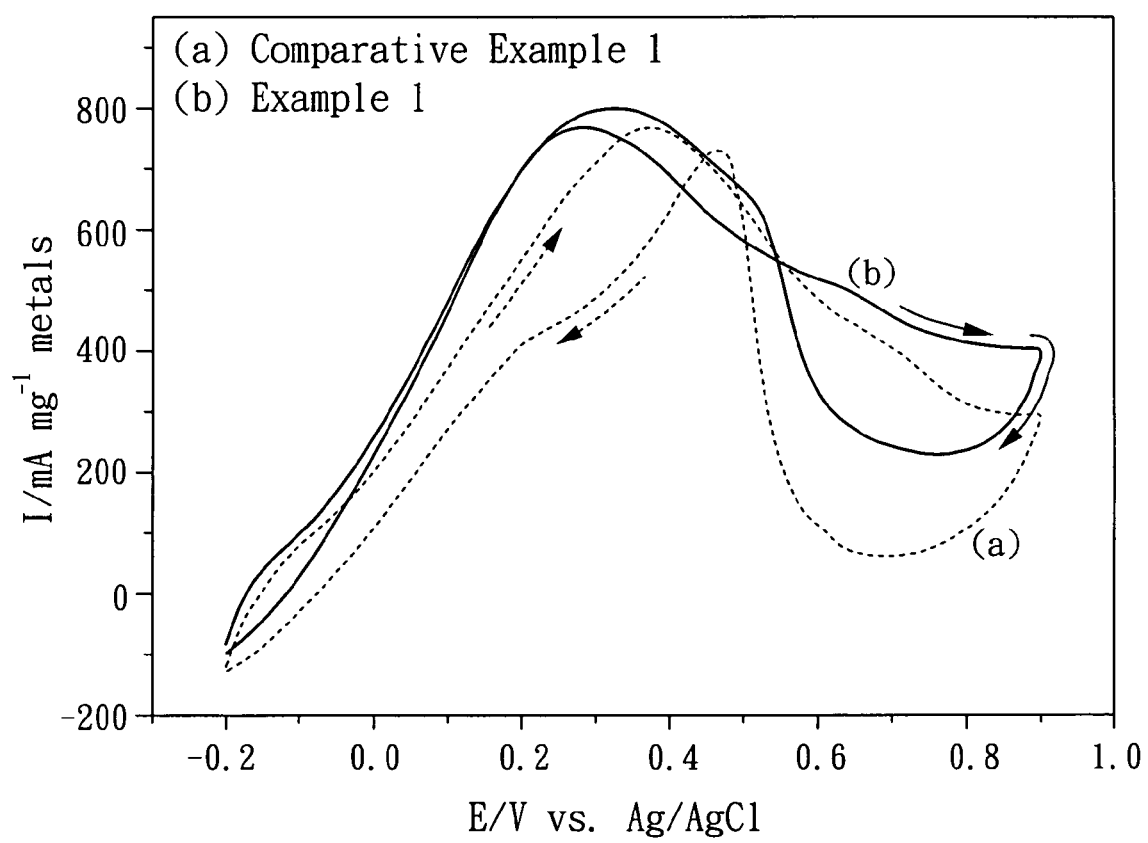
FIG. 3 shows cyclic voltammetry diagram (20 cycles) according to Pd—Au/MWCNTs provided by Example 1 and Pd/MWCNTs provided by Comparative Example 1.

The cyclic voltammetry test is performed on Pd—Au/MWCNTs and Pd/MWCNTs (i.e. the comparative sample A) prepared by Example 1 and Comparative Example 1, respectively. The test conditions are listed as follows: (1) the anode is 3M HCOOH+1M $H_2SO_4$ solution, and Pd—Au/MWCNTs of Example 1 and Pd/MWCNTs of Comparative Example 1 are used as catalyst, respectively; (2) the cathode is Ag/AgCl;

(3) the rotating electrode is set at 1000 rpm; and (4) the scanning speed is set at 10 mVs⁻¹. FIG. 3 shows the results after 20 cycles.

From FIG. 3, it can be found that effective current can be achieved at lower voltage and larger current is presented in the case of using the Pd—Au/MWCNTs catalyst composition of Example 1 (see the curve (b)) in comparison to the comparative sample A (Comparative Example 1, Pd/MWCNTs, see the curve (a)). Thereby, it can be confirmed from FIG. 3 that the Pd—Au/MWCNTs catalyst composition of Example 1 exhibits better electrochemical characteristics than Pd/MWCNTs.

Figure 4A:
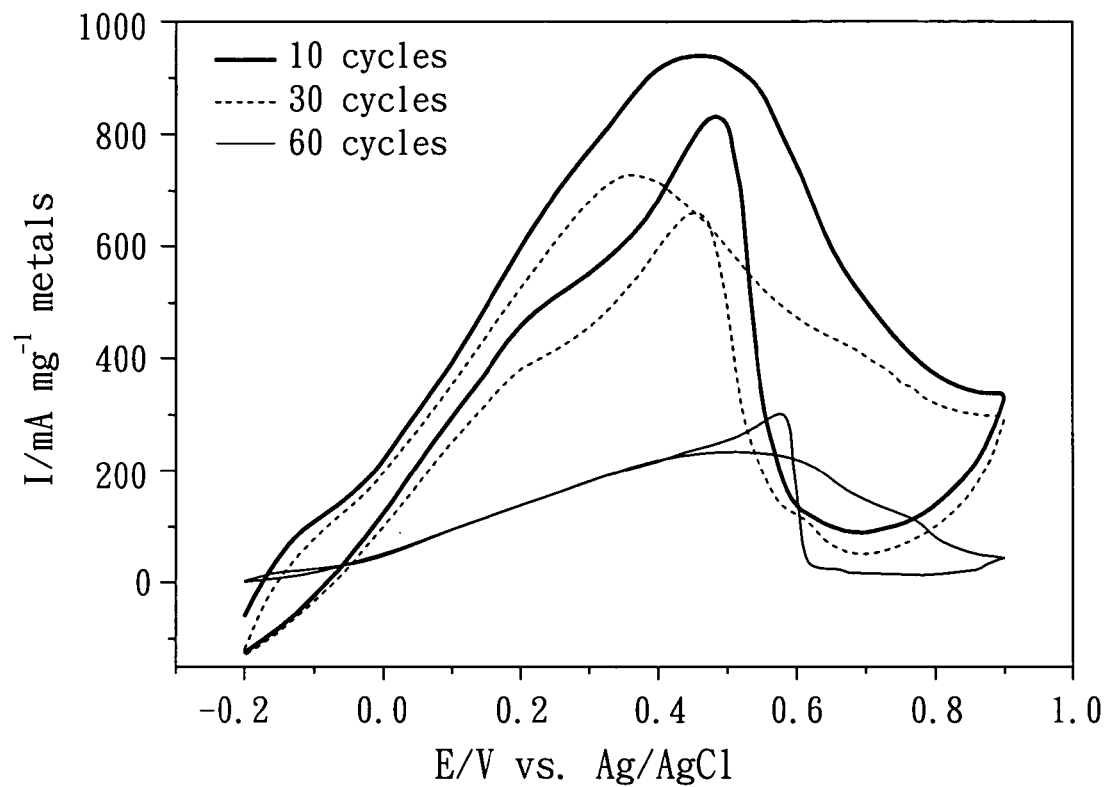
FIG. 4A shows a repeated cyclic voltammetry diagram (10 cycles, 30 cycled and 60 cycles) according to Pd/MWCNTs provided by Comparative Example 1.
Figure 4B:
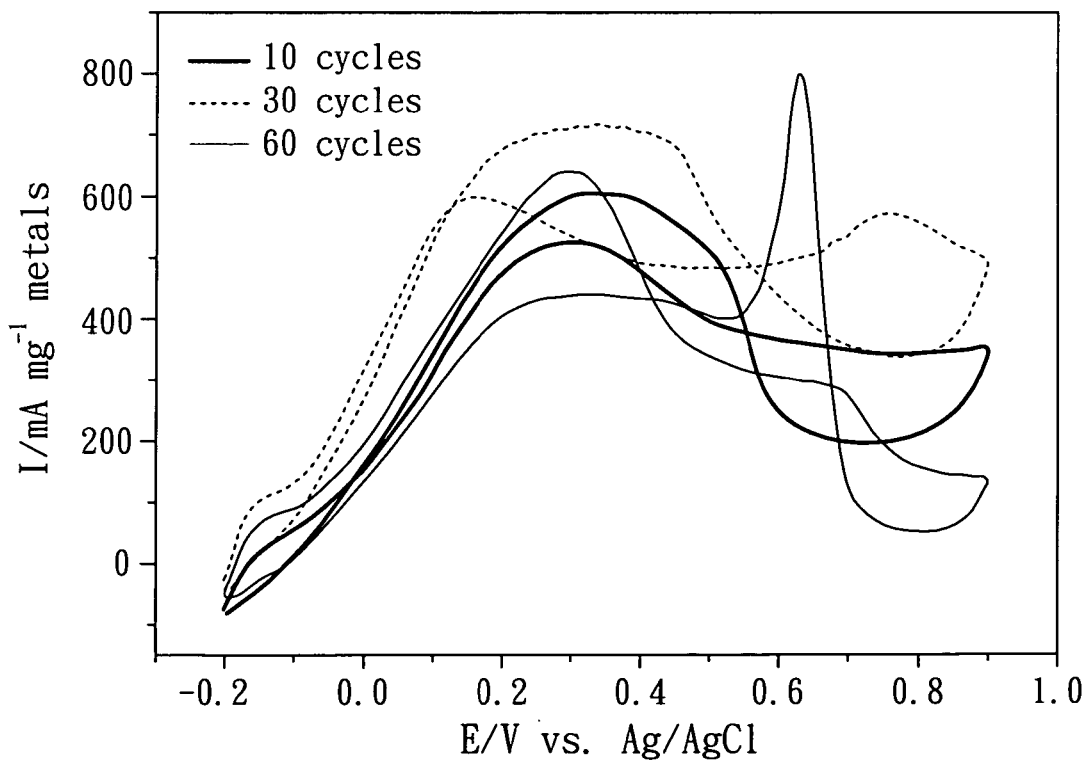
FIG. 4B shows a repeated cyclic voltammetry diagram (10 cycles, 30 cycled and 60 cycles) according to Pd—Au/MWCNTs provided by Example 1.

In addition, FIGS. 4A and 4B show the repeated cyclic voltammetry (10 cycles, 30 cycled and 60 cycles) diagram according to Pd/MWCNTs (Comparative Example 1, the comparative sample A) and Pd—Au/MWCNTs (Example 1), respectively. As shown in FIG. 4A, the current significantly decreases after repeated cycles in the case of using Pd/MWCNTs (Comparative Example 1, the comparative sample A). That is, the stability of Pd/MWCNTs is lower. However, as shown in FIG. 4B, the excellent electrochemical characteristics are maintained after repeated cycles in the case of using Pd—Au/MWCNTs (Example 1). That is, the stability of Pd—Au/MWCNTs (Example 1) is better than that of Pd/MWCNTs (Comparative Example 1, the comparative sample A).

Figure 5:
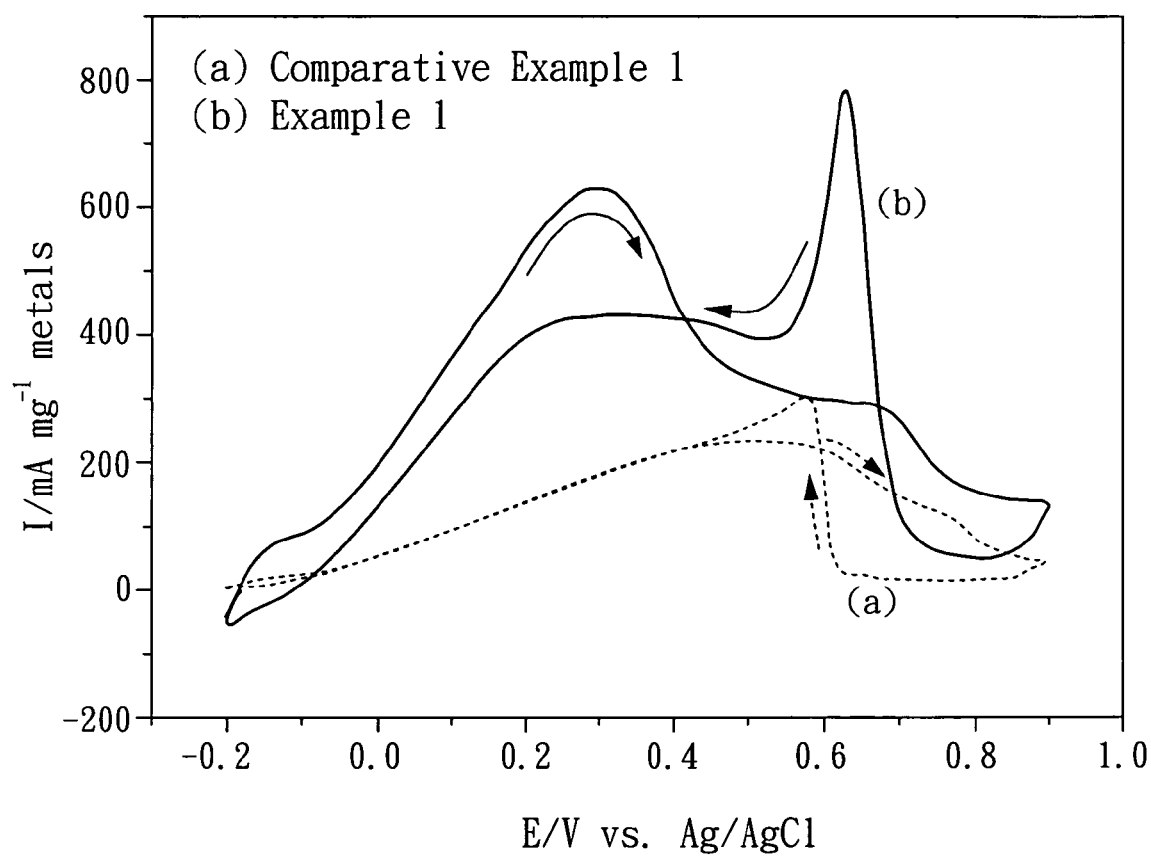
FIG. 5 shows a repeated cyclic voltammetry diagram (60 cycles) according to Pd—Au/MWCNTs provided by Example 1 and Pd/MWCNTs provided by Comparative Example 1.

Moreover, with reference to FIG. 5, Pd/MWCNTs (Comparative Example 1, the comparative sample A) and Pd—Au/MWCNTs (Example 1) are compared after 60 cycles. As shown in FIG. 5, after 60 cycles, the effective current can be achieved at lower voltage and larger current is presented by using the Pd—Au/MWCNTs (Example 1, see the curve (b)) in comparison to the comparative sample A (Comparative Example 1, Pd/MWCNTs, see the curve (a)). That is, after repeated cycles, the improved electrochemical characteristics can be presented in the case of using Pd—Au/MWCNTs (Example 1).

Although the present invention has been explained in relation to its preferred embodiment, it is to be understood that many other possible modifications and variations can be made without departing from the scope of the invention as hereinafter claimed.

What is claimed is:

1. A method for fabricating a catalyst composition, comprising:
    (A) mixing a catalyst carrier and a reducing agent to form a solution;
    (B) adding a palladium precursor and a second metal precursor into the solution to perform a reduction reaction and thus to deposit palladium and a second metal on the surface of the catalyst carrier, wherein the second metal is selected from the group consisting of gold, platinum, ruthenium, nickel, silver and manganese; and
    (C) performing a first heat treatment on the catalyst carrier with the palladium and the second metal deposited thereon, and performing a second heat treatment in the presence of a reducing gas to form a metal solid solution on the surface of the catalyst carrier, wherein the metal solid solution includes the palladium and the second metal.

2. The method as claimed in claim 1, wherein the reducing gas is a mixture of hydrogen gas and argon gas.

3. The method as claimed in claim 2, wherein the ratio of the hydrogen gas to the reducing gas is in a range of 1% to 10% by mole.

4. The method as claimed in claim 1, wherein the first heat treatment is performed at a temperature in a range of 200° C. to 300° C.

5. The method as claimed in claim 1, wherein the second heat treatment is performed at a temperature in a range of 180° C. to 250° C.

6. The method as claimed in claim 1, wherein in the step (B), the palladium precursor and the second metal precursor are added into the solution in sequence.

7. The method as claimed in claim 1, wherein in the step (B), the reduction reaction of the palladium precursor and the second metal precursor is performed at a temperature in a range of 150° C. to 300° C.

8. The method as claimed in claim 1, wherein in the step (B), pH value of the solution is adjusted in a range of 6 to 12.

9. The method as claimed in claim 1, wherein the catalyst carrier is a carbon nanotube or a carbon black.

10. The method as claimed in claim 1, wherein the reducing agent is a polyol solvent.

11. The method as claimed in claim 1, wherein the reducing agent is ethylene glycol, propylene glycol or butylene glycol.

12. The method as claimed in claim 1, wherein the palladium precursor is palladium salts, palladium hydrates or palladium chloride.

13. The method as claimed in claim 1, wherein the second metal precursor is metal salts, metal hydrates or metal chlorides.

* * * * *